April 1, 1952

H. A. HOWELL

COMBINED MAGNETIC TRANSDUCER HEAD AND OUTPUT TRANSFORMER

Filed April 17, 1947

2,591,070

Inventor

HUGH A. HOWELL.

by The Firm of Charles W. Hills Attys.

Patented Apr. 1, 1952 2,591,070

UNITED STATES PATENT OFFICE 2,591,070

COMBINED MAGNETIC TRANSDUCER HEAD AND OUTPUT TRANSFORMER

Hugh A. Howell, Valparaiso, Ind., assignor to The Indiana Steel Products Company, Chicago, Ill., a corporation of Indiana Application April 17, 1947, Serial No. 742,142

5 Claims. (Cl. 179—100.2)

This invention relates to a magnetic recording and reproducing device, and more particularly, to an electromagnetic transducer head.

Magnetic recording and reproducing apparatus which is arranged to make a magnetic record on a traveling magnetizable record member which represents a fluctuating signal, sound, or the like to be recorded. Audible sounds are changed into fluctuating electric signals which, in turn, are changed into fluctuating magnetic signals. The signal, when recorded, is played back by changing the fluctuating magnetic signal into an electrical impulse which, in turn, is changed into a sound wave. The head or structure which changes the electrical impulses into a fluctuating magnetic field, or which changes the fluctuating magnetic fields along the record member into fluctuating electric signals, is referred to as an electromagnetic transducer head.

One of the principal features and objects of the present invention is to provide a novel electromagnetic transducer head.

A further object of the present invention is to provide a novel electromagnetic transducer head in which a small transformer is built directly into the head.

A still further object of the present invention is to provide a novel electromagnetic transducer head including a transformer with a low impedance winding which surrounds not only a portion of the magnetic circuit of the transformer but a portion of the magnetic circuit of the core piece which form the pole pieces of the electromagnetic transducer head.

Another and further object of the present invention is to provide a novel method and means for recording signals on a traveling magnetizable record member and for reproducing signals therefrom.

The novel features which I believe to be characteristic of my invention are set forth with particularity in the appended claims. My invention itself, however, both as to its organization, manner of construction and method of operation, together with further objects and advantages thereof, may best be understood by reference to the following description taken in connection with the accompanying drawing, in which:

Figure 1:
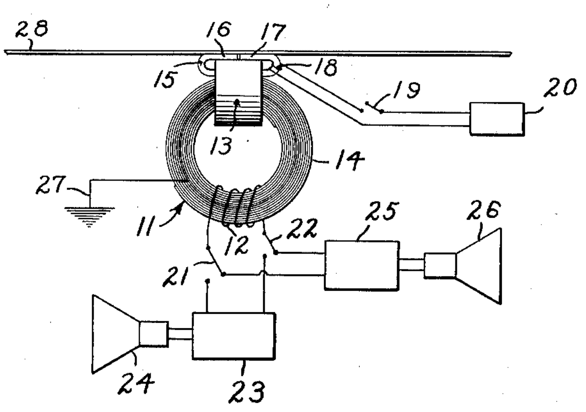
Figure 1 is a schematic diagram illustrating an electromagnetic transducer head embodying the novel teachings and principles of the present invention and over which a traveling record member is passing.

Referring first to Figure 1 of the drawing, there is illustrated therein, an electromagnetic transducer head which includes a small transformer 11 having a relatively high impedance winding 12 and a relatively low impedance winding 13. The winding 13 may, by way of example, be a single turn of flat copper strip stock. The core 14 of the transformer 11 is laminated in a direction transverse to the plane of its closed path, and this may be conveniently done by spirally winding a ribbon of soft iron or some other iron alloy having high permeability but low magnetic retentivity.

Also interlocked with the single turn winding 13 is the core portion 15 which extends through the copper loop 13 and terminates in two confronting pole portions 16 and 17. A high frequency component for the recording operation may be conveniently provided by a low impedance winding 18 which is arranged to be connected through a switch 19 to a source of high frequency 20.

The high impedance winding 12 on the transformer 11 is arranged to be connected through switches 21 and 22 to an amplifier 23 which, in turn, is connected to a microphone or other signal source 24. The switches 21 and 22 are also arranged to connect the coil 12 to an audio amplifier 25 which, in turn, is connected to a loud speaker or other load 26. The core 14 of the transformer 11 may be grounded, if desired, as at 27.

To make a magnetic record of a signal derived from the source 24, the switches 21 and 22 are positioned to connect the coil 12 to the amplifier, and the switch 19 is closed to connect the high frequency source 20 to the bias winding 18. A magnetizable record member 28 such, for example, as a paper tape, having powdered permanent magnet material coated thereon is passed over the poles 16 and 17 and a signal is thus magnetically recorded thereon.

When it is desired to play this record back, the magnetic record member 28 is passed in the same direction across the poles 16 and 17 with the switches 21 and 22 connecting the coil 12 to the amplifier 25 and with the switch 19 open. The record is thus played back through the speaker or load 26.

Figure 2:
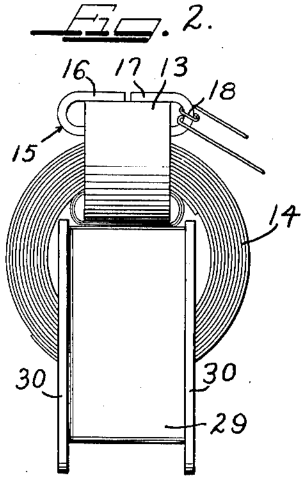
Figure 2 is a front view of an electromagnetic transducer head such as that diagrammatically represented in Figure 1.
Figure 3:
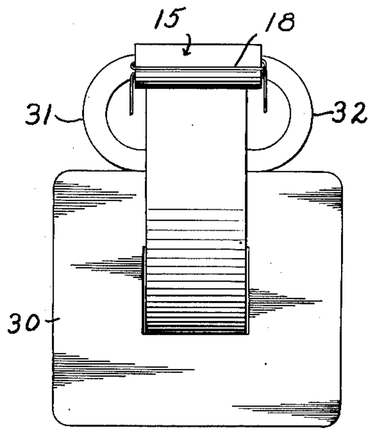
Figure 3 is a side view of the electromagnetic transducer head shown in Figure 2.
Figure 4:
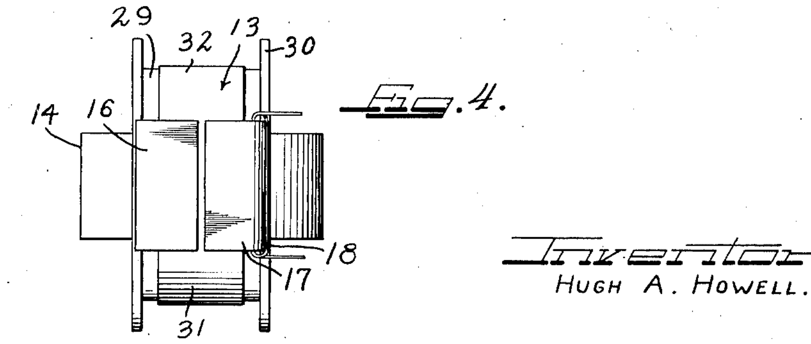
Figure 4 is a top view of the electromagnetic transducer head shown in Figure 2.

Figures 2, 3 and 4 illustrate the details of construction of one embodiment of the present invention which have been diagrammatically illustrated in Figure 1. As shown, the winding 12 may be wound on any drum 29 having end flanges 30. The copper strip which forms the single turn winding 13 is preferably disposed tightly against the core 14, but the end loops 31 and 32 are preferably spaced away from the front and rear face of the core 14. The member 15 which forms the poles 16 and 17 is preferably pinched tightly between the copper strip forming the single turn winding 13 and the core 14, and the upper portion of the core 15 which forms the legs 16 and 17 is also pressed down tightly against the single turn winding 13.

It has been found in practice that a head of this character has an extremely fine high frequency response on pick-up, as well as having a good low frequency response. The difficulty with many electromagnetic transducer heads employed with magnetic recording and reproducing machines of the past lies in the fact that while they have reasonably good low frequency response, they have not had good high frequency response, and particularly, have not had good response in both the low frequency and high frequency range.

It will be observed that from the nature of the construction of the electromagnetic transducer head, the high frequency component fed from the high frequency source 20 to the high frequency bias winding 18 will not be reflected back into the low frequency amplifier 23 due to the construction of the transformer 11.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. An electromagnetic transducer head comprising a pair of core members and a pair of coils, one of said coils being an input-output coil which is wound on a first one of said core members and the other of said coils being a single turn short-circuited coil wound on both of said core members, the second one of said core members being a strip of magnetic material of high permeability and low retentivity, the second coil being mounted on an intermediate portion thereof and the ends of said strip being bent back over said coil in closely spaced confronting relationship thereby to define a gap across which a magnetic record member is arranged to pass.

2. An electromagnetic transducer head comprising a pair of core members and a pair of coils, one of said core members being a tight spirally wound ribbon of magnetic material having relatively high permeability and low retentivity, and the second core member being a single strip of magnetic material being bent into a relatively flat substantially closed loop having a gap in one of the flattened sides thereof, one of said coils being wound on said first core member and having terminals arranged to be connected to an amplifier, the second of said coils being a low impedance coil wound on both of said core members.

3. An electromagnetic transducer head comprising a pair of core members and a pair of coils, one of said core members being a tight spirally wound ribbon of magnetic material having relatively high permeability and low retentivity, and the second core member being a single strip of magnetic material being bent into a relatively flat substantially closed loop having a gap in one of the flattened sides thereof, one of said coils being wound on said first core member and having terminals arranged to be connected to an amplifier, and the second of said coils being a single turn short-circuited coil wound on both of said core members.

4. An electromagnetic transducer head comprising a pair of core members and a pair of coils, one of said core members being a tight spirally wound ribbon of magnetic material having relatively high permeability and low retentivity, and the second core member being a single strip of magnetic material being bent into a relatively flat substantially closed loop having a gap in one of the flattened sides thereof, one of said coils being wound on said first core member and having terminals arranged to be connected to an amplifier, said second coil being a closed ring of low electrical resistance.

5. An electromagnetic transducer head comprising a pair of core members and a pair of coils, one of said core members being a tight spirally wound ribbon of magnetic material having relatively high permeability and low retentivity, and the second core member being a single strip of magnetic material being bent into a relatively flat substantially closed loop having a gap in one of the flattened sides thereof, one of said coils being wound on said first core member and having terminals arranged to be connected to an amplifier, the second of said coils being a low impedance coil wound on both of said core members, and a third coil on said second core member arranged to be connected to a source of high frequency alternating current.

HUGH A. HOWELL.

REFERENCES CITED

The following references are of record in the file of this patent:

UNITED STATES PATENTS

| Number | Name | Date |
|---|---|---|
| 1,640,881 | Carlson | Aug. 30, 1927 |
| 1,720,943 | Chapman | July 16, 1929 |
| 1,915,804 | Smith | June 27, 1933 |
| 2,351,003 | Camras | June 13, 1944 |
| 2,351,011 | Camras | June 13, 1944 |
| 2,381,463 | Potter | Aug. 7, 1945 |
| 2,418,542 | Camras | Apr. 8, 1947 |
| 2,456,767 | Camras | Dec. 21, 1948 |
| 2,469,444 | Roys | May 10, 1949 |

FOREIGN PATENTS

| Number | Country | Date |
|---|---|---|
| 612,450 | Germany | Apr. 25, 1935 |